July 28, 1970 C. M. GOODYEAR ET AL 3,521,634
ANESTHETIZING APPARATUS
Filed Oct. 23, 1965 5 Sheets-Sheet 1

INVENTORS.
CHALMERS M. GOODYEAR
CHARLES R. TOBIN
BY
Albert M. Parker
ATTORNEY

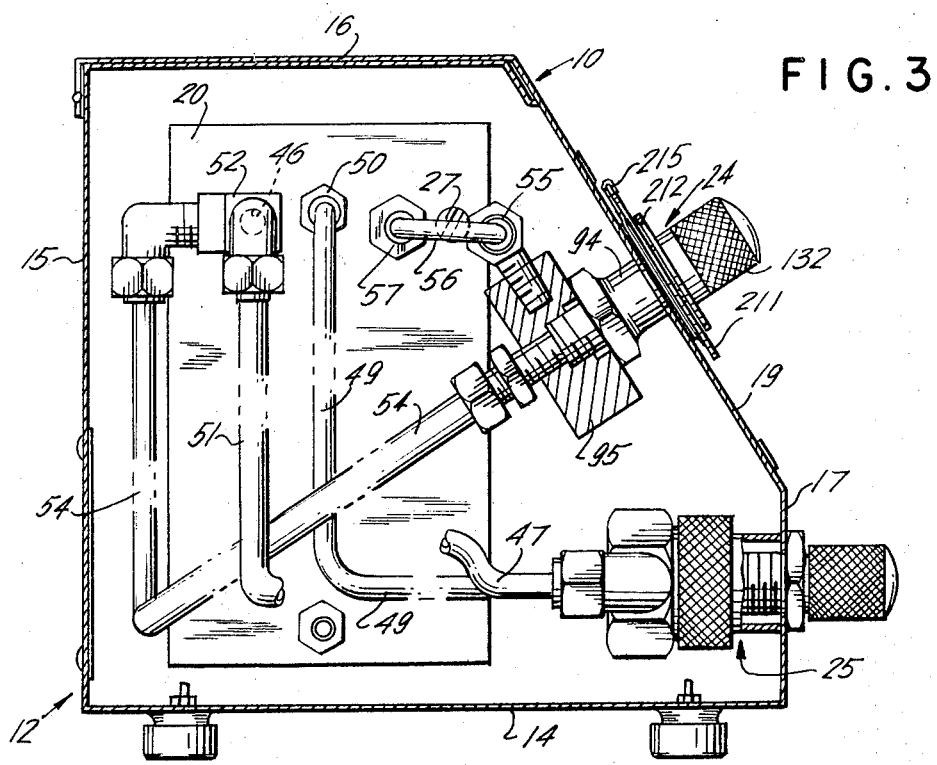
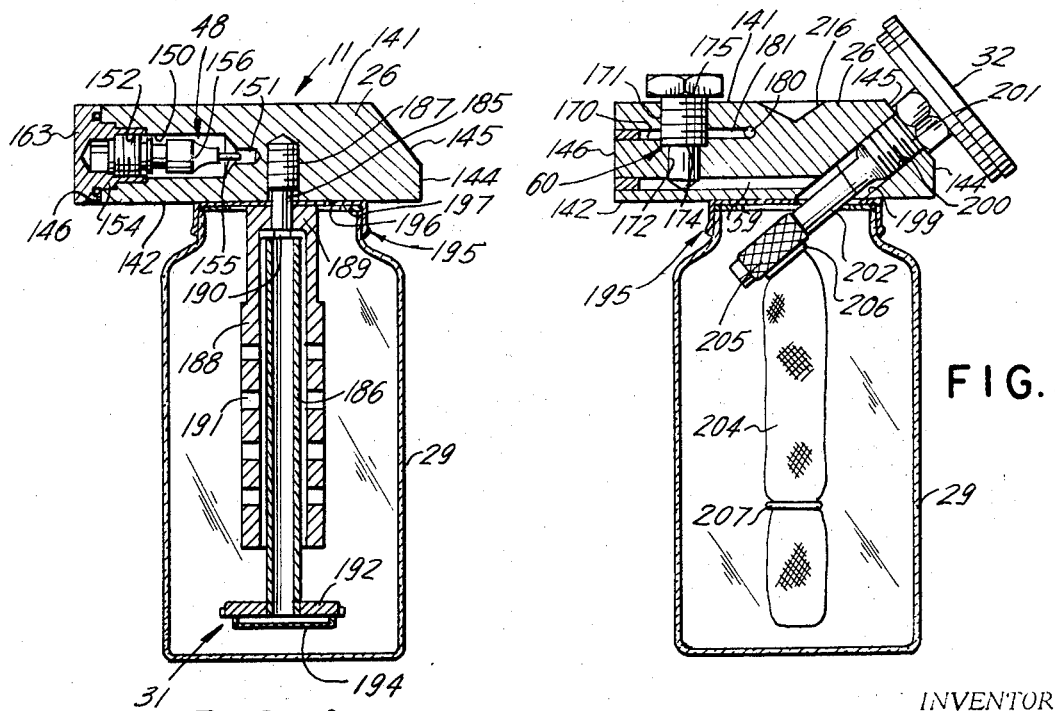
FIG. 3
FIG. 4
FIG. 5
INVENTORS.
CHALMERS M. GOODYEAR
CHARLES R. TOBIN
BY
Albert M. Parker
ATTORNEY

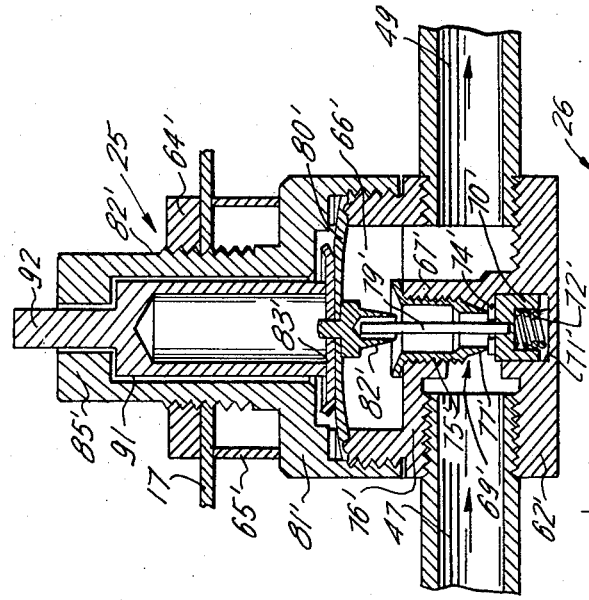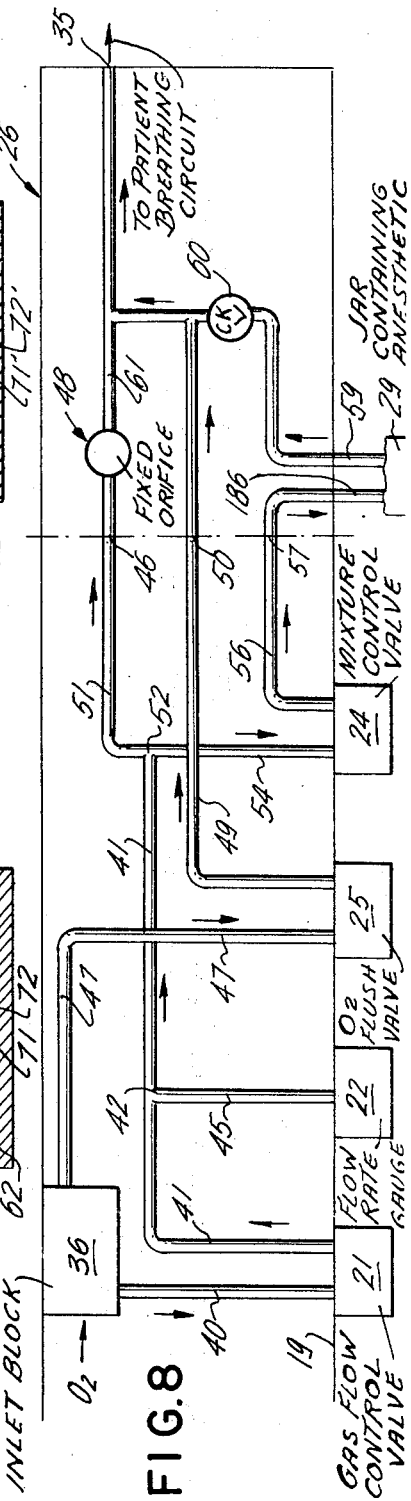

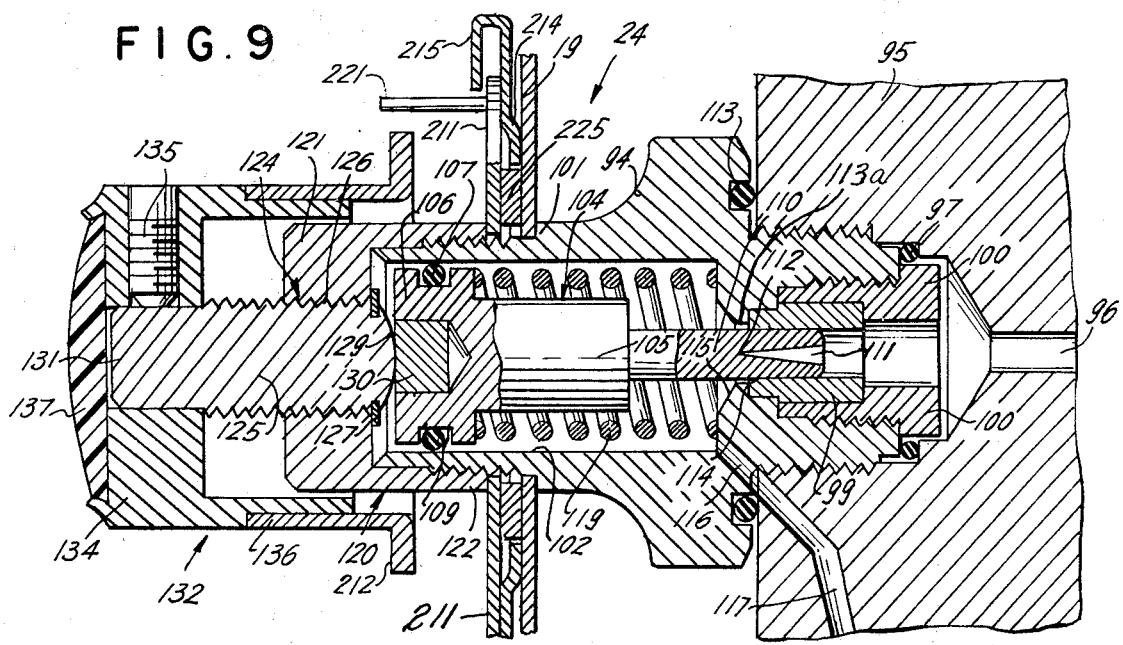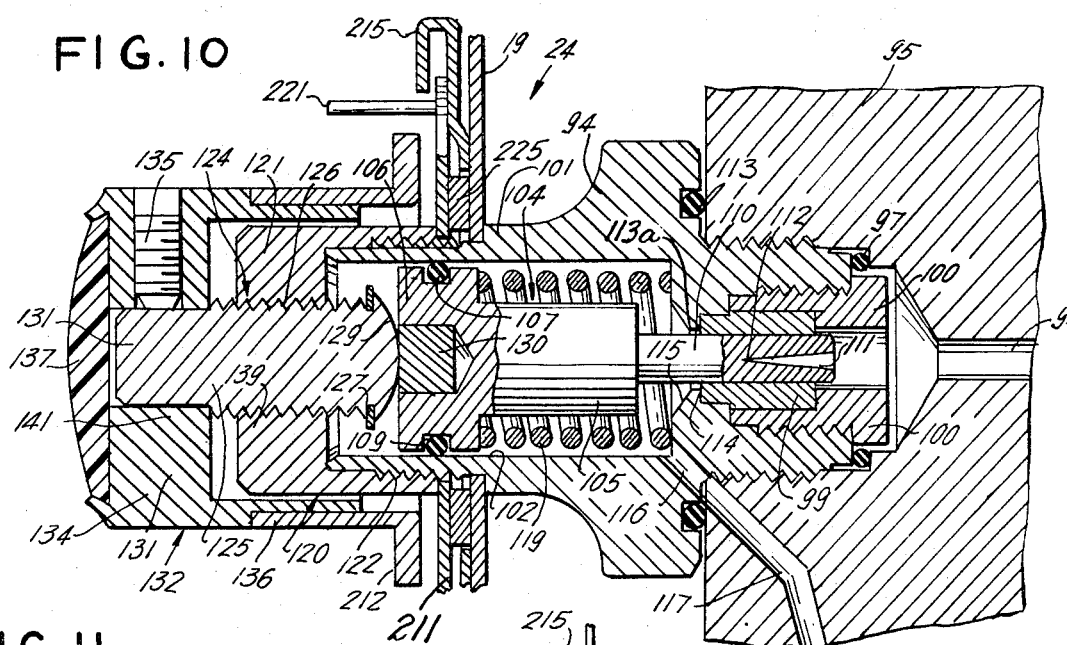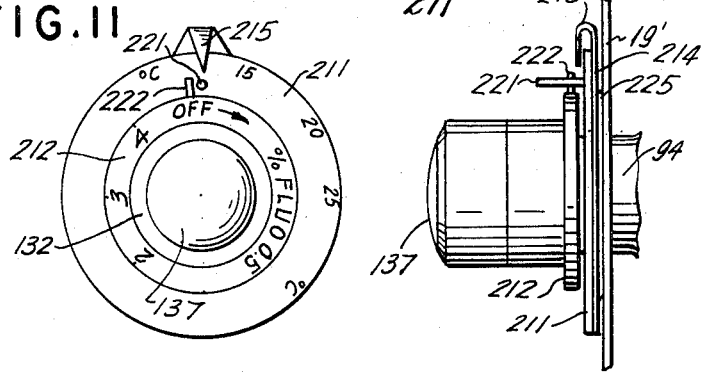

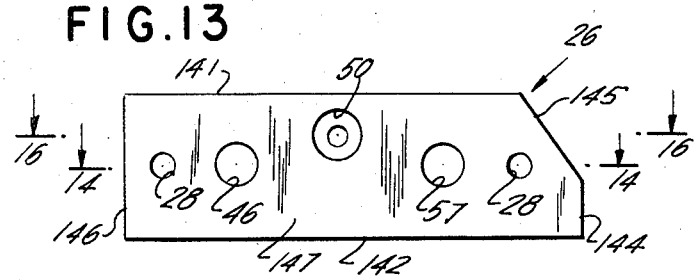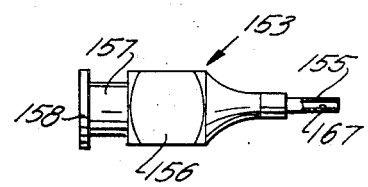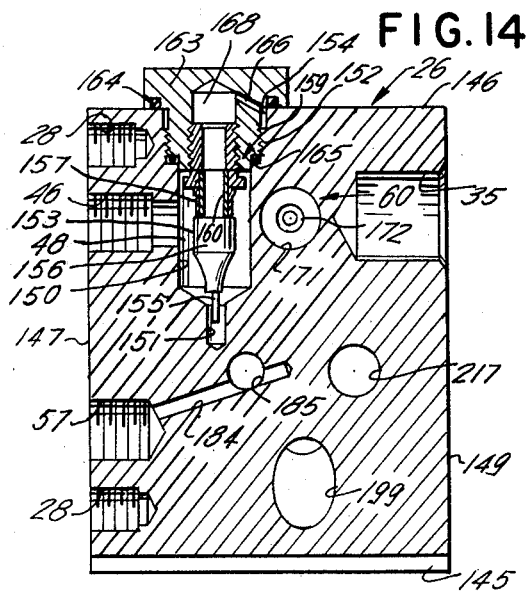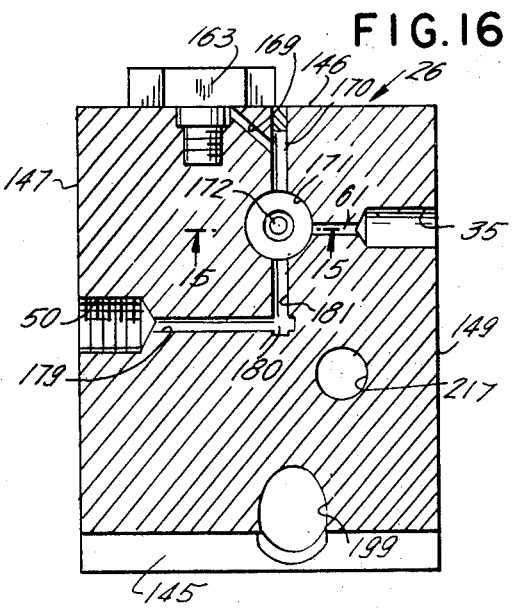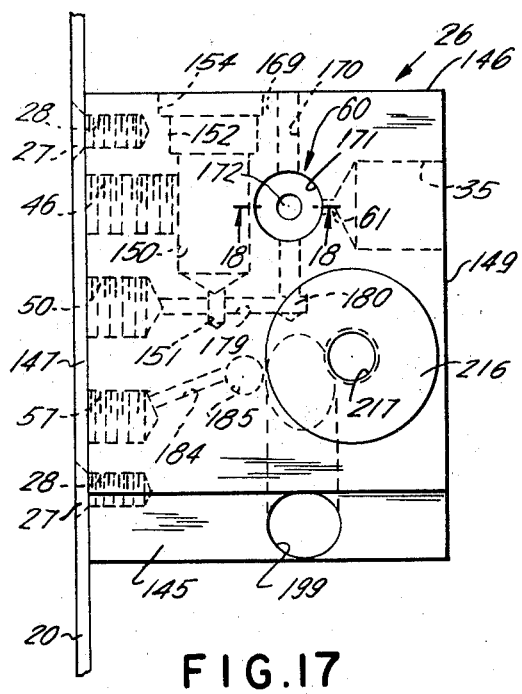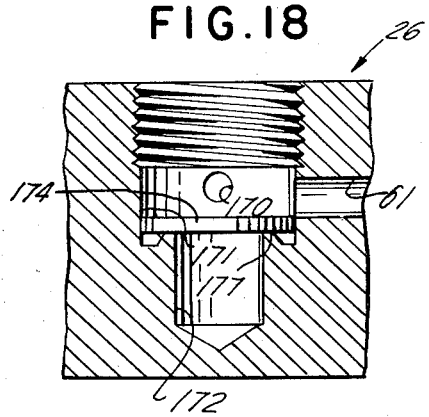
INVENTORS
CHALMERS M. GOODYEAR
CHARLES R. TOBIN
BY Albert M. Parker
ATTORNEY United States Patent Office 3,521,634
Patented July 28, 1970

3,521,634
ANESTHETIZING APPARATUS
Chalmers M. Goodyear, Huntington, and Charles R. Tobin, Port Washington, N.Y., assignors to The Foregger Company, Inc., Roslyn Heights, N.Y., a corporation of New York
Filed Oct. 23, 1965, Ser. No. 503,708
Int. Cl. A61m 17/00
U.S. Cl. 128—188                    13 Claims

ABSTRACT OF THE DISCLOSURE

Anesthesia apparatus where settable gas flow is shown on a dial and where a relatively constant percentage of anesthetic gas in an oxygen flow is provided at a given temperature regardless of the volume of flow. A pair of orifices, one adjustable, provides means for maintaining such constant percentage at different temperatures. A mere dial adjustment in response to a showing of temperature change in the vaporizer is all that is necessary.

---

The anesthesia apparatus disclosed herein is particularly adapted for use in animal surgery, although it may be used to advantage for human patients. Anesthetic vaporizers of the type with which the present invention is concerned may employ, for example, an anesthetic such as halothane, sometimes called "Fluothane", which is administered to the patient in the form of a vapor mixed with a gas such as oxygen or air. The anesthetic is provided in liquid form in the bottom of a closed chamber, a portion of the carrier gas being circulated across the top of or bubbled through the liquid anesthetic so as to vaporize it and to become mixed with it. The resulting mixture is then forwarded to mix with the main gas stream, the final gas and vaporized anesthetic mixture being then discharged into the breathing circuit.

The concentration of vaporized anesthetic, that is, its percentage volume that can be contained in a saturated mixture of carrier gas and vaporized anesthetic, is dependent upon the vapor pressure of the liquid anesthetic. The vapor pressure of the liquid anesthetic varies with temperature. The apparatus of the present invention incorporates means for adjusting the rate of flow of the vaporized anesthetic-gas mixture so that the anesthetist may control the percentage of anesthetic in the mixture delivered to the patient in such manner that such percentage remains substantially constant.

The apparatus of the present invention is readily portable, and does not require a separate gas machine unit. Thus the apparatus has its own flow meter and controls. The apparatus is of simplified construction and may be easily operated, and is particularly characterized by its economy of construction.

It is accordingly among the objects of the invention to provide a novel simplified and improved anesthesia apparatus.

A further object of the invention lies in the provision of an improved anesthetic vaporizer which is particularly characterized by its ease of control and its ease of adjustment to maintain a substantially constant percentage of vaporized anesthetic which it delivers, despite changes in temperature and the rate of flow of the carrier gas-vaporized anesthetic mixture.

Yet another object of the invention lies in the provision, in an anesthetic vaporizer, of an improved novel valve for controlling the rate of flow of the anesthetic-gas mixture.

Another object is the provision in an anesthesia apparatus of the type described of means including a high flow rate flush valve for flushing the system with a large volume of oxygen.

Other objects of the invention reside in the provision, in an anesthetic vaporizer of the type described, of a novel bubbler device whereby the carrier gas entrains vaporized anesthetic, of a novel combination of bubbler device and control valve-containing unit, and of a novel fixed orifice device which is employed to meter carrier gas which is mixed with the gas-anesthetic mixture delivered to the patient's breathing circuit.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in front elevation of an illustrative embodiment of anesthetic vaporizer made in accordance with the invention;

FIG. 3 is a view in vertical section through the vaporizer, the view being taken along the line 3—3 of FIG. 1 looking in the direction of the arrows;

FIG. 4 is a view in vertical section through the bubbler unit of the vaporizer, the section being taken along the line 4—4 of FIG. 1 looking in the direction of the arrows;

FIG. 5 is a view in vertical section through the bubbler unit, the section being taken along the line 5—5 of FIG. 1 looking in the direction of the arrows;

FIG. 6 is a view in axial section through the oxygen flow controlling valve of the vaporizer;

FIG. 7 is a view in axial section through the oxygen flush valve of the vaporizer;

FIG. 8 is a schematic view showing the manner of connection of the various valves and fittings of the vaporizer;

FIG. 9 is a view in axial section through the gas-anesthetic mixture-controlling valve of the vaporizer, the valve being shown in open, adjusted position;

FIG. 10 is a view similar to FIG. 9 but with the gas-anesthetic mixture-controlling valve being shown in closed position;

FIG. 11 is a view in front elevation of the valve of FIGS. 9 and 10 particularly illustrating the temperature and gas-anesthetic mixture percentage dials associated with such valve;

FIG. 12 is a fragmentary view in side elevation of the gas-anesthetic mixture-controlling valve and of the dials associated therewith;

FIG. 13 is a view in side elevation of the block forming the head of the bubbler unit of the vaporizer;

FIG. 14 is a view in horizontal section through such block, the section being taken along the line 14—14 of FIG. 13 looking in the direction of the arrows;

FIG. 15 is an enlarged view in side elevation of the inner body of the fixed orifice means for the carrier gas to be mixed with the gas-anesthetic mixture;

FIG. 16 is a view in horizontal section through the head block of the bubbler, such section being taken along the line 16—16 of FIG. 13 looking in the direction of the arrows;

FIG. 17 is a view in plan of the head block of the bubbler, some of the various cavities and passages in the block being indicated in phantom lines; and FIG. 18 is a fragmentary view in vertical section through the head block of the bubbler, the section being taken along the line 18—18 of FIG. 17 in the direction of the arrows.

Figure 1:
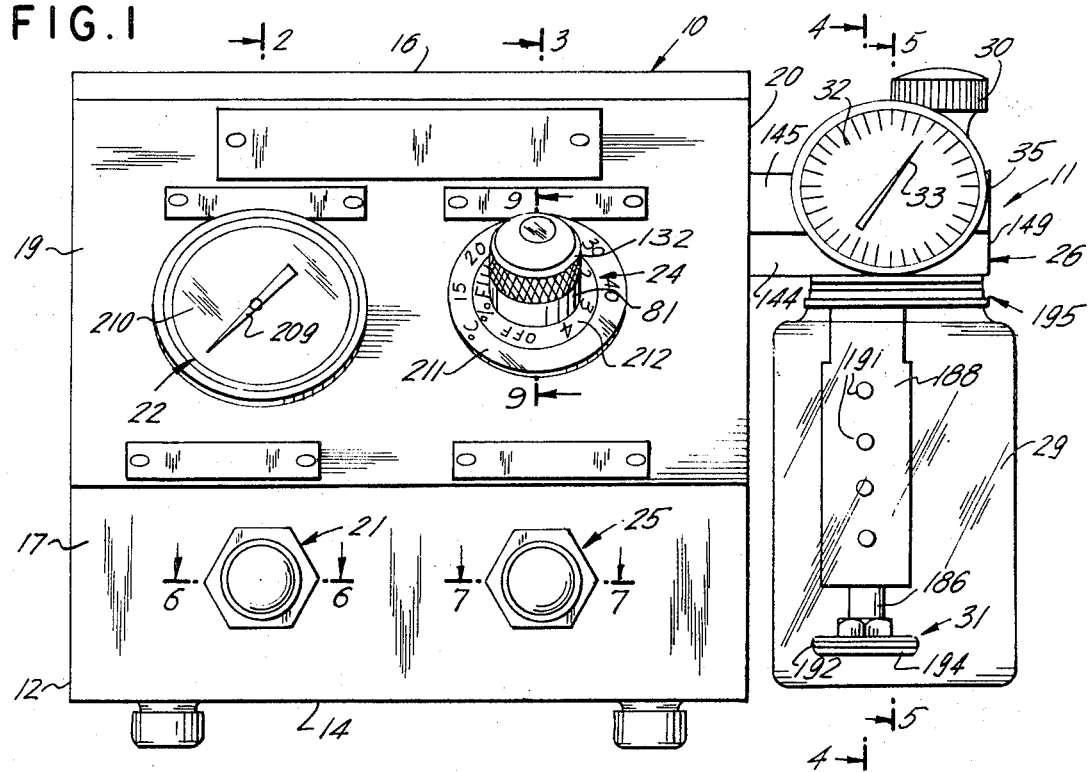

The anesthesia apparatus shown herein includes a control unit 10 which is in the form of a cabinet including flow-controlling valves and a flow meter and a bubbler or vaporizer unit 11 which is secured to one end of such cabinet. The cabinet of unit 10 is generally designated by the reference character 12; such cabinet, which may be made of sheet metal, includes a bottom 14, a back 15, a top 16, and a front which is composed of a short vertically extending lower portion 17 and a rearwardly slanting upper portion 19. The bubbler or vaporizer unit 11 is attached to an end wall 20 of the cabinet, as shown.

The unit 10 includes an oxygen control valve 21 mounted on portion 17 of the front panel of the cabinet, and an oxygen flow rate gauge 22 mounted above valve 21 on portion 19 of the front panel of the cabinet. Unit 10 also includes a valve 24 mounted on portion 19 of the panel, such valve providing for the adjusting of the percentage of vaporized anesthetic in the gas-anesthetic mixture, as will appear hereinafter. Mounted below valve 24 is a further valve 25 which functions as an oxygen flush valve to clear the system of the anesthetic apparatus after it has been used.

The bubbler or vaporizer unit 11 includes a head block 26 which is secured to the end wall 20 of the unit 10 by two machine screws 27, as shown in FIGS. 3 and 17. Depending from the lower surface of block 26 and secured to a cap-like holder 195 mounted thereon is a jar 29 which is adapted to be filled or partially filled with vaporizable anesthetic. For this purpose there is provided a vertical filling passage 217 through block 26, such passage being provided with a stopper device 30. To minimize spillage of the anesthetic, a frusto-conical depression 216 is provided in the top surface of block 26 around the upper end of passage 217. A bubbler device 31, to be described more fully hereinafter, is disposed within jar 29. Also mounted within jar 29 is the stem of a thermometer 32 which is shown as of the dial type having a needle 33 cooperating with the dial, as shown in FIG. 1.

Figure 2:
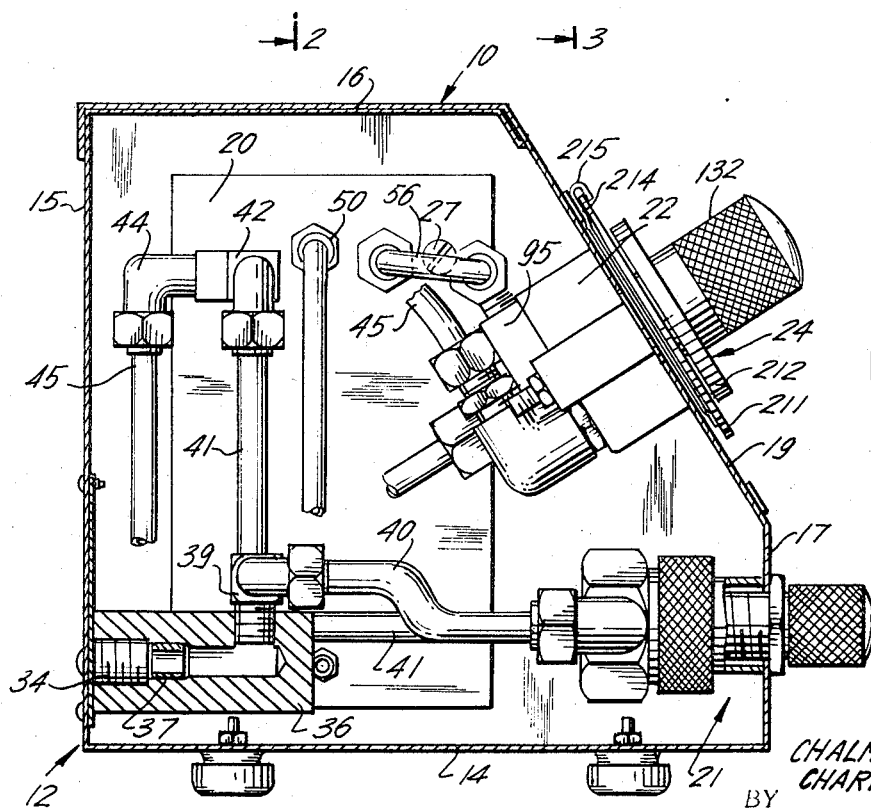
FIG. 2 is a view in vertical section through the vaporizer, the section being taken along the line 2—2 of FIG. 1 looking in the direction of the arrows.

Oxygen is admitted to the unit 10 through an inlet passage 34 which is formed in an inlet block 36, which is shown as the lower left in FIG. 2. The final mixture of oxygen with the oxygen-anesthetic mixture formed by the unit is discharged therefrom through an outlet 35 formed within the right-hand end of the head block 26 as it is shown in FIG. 1. Outlet 35 is particularly shown in FIGS. 14, 16, and 17. Oxygen entering the passage 34 flows through a filter 37 and into a T fitting 39 which is secured to block 36. The pipe 40 extends from fitting 39 to the oxygen flow control valve 21. Outlet pipe 41 from valve 21 extends to a T fitting 42 and is connected through an elbow 44 and a pipe 45 to the flow rate gauge 22 which is a pressure detecting gauge calibrated in rate of flow. Pipe 41 extends from the fitting 42 to a further T fitting 52 and thence, now designated 51, to an oxygen inlet passage 46 of block 26, shown at the left in FIG. 13.

From the inlet block 36 there also extends a pipe 47 which is connected to the oxygen flush valve 25. An outlet pipe 49 from valve 25 extends to the central opening 50 in the block 26; see FIGS. 13, 16, and 17. From the fitting 52 a pipe 54 extends to the gas-anesthetic controlling valve 24, the outlet from such valve being connected by a pipe 56 to the right-hand passage 57 of the block 26 (FIG. 13). Upon entering through passage 57 in block 26 oxygen travels into the bubbler device in jar 29 to form a mixture of oxygen and vaporizable anesthetic. Such mixture emerges from the bubbler through the passage 59, in which it flows around the stem 202 of the thermometer 32, past a check valve 60 in block 26, through a common passage 61 where it joins the pure oxygen which flows through orifice 48. This further mixture flows to the outlet passage 35, above referred to. The fixed orifice 48 is elongated to promote the maintenance of laminar flow.

THE OXYGEN VALVE 21

The oxygen flow control valve 21, which is shown more particularly in FIG. 6, has a body 62 to which the pipes 40 and 41 are connected as shown. Valve 21 is mounted upon the lower vertical front panel portion 17 of the cabinet; thus the forward end 84 of the valve body extends through a hole in such panel portion, such panel portion being grasped between a nut 64 on the valve and a spacer sleeve 65. The body 62 of the valve has a cavity generally designated 66, such cavity being divided by a transverse partition 67 which, when the valve is closed, forms with the engaging valve seats a barrier between the pipes 40 and 41. The valve device 69 includes a plunger 70 which is slidable in a bore 71 and is constantly urged inwardly of the valve body by a coil compression spring 72 acting between the end wall of the bore 71 and the plunger 70. Plunger 70 carries on its inner end an O-ring 74 which forms one of the seats of the valve, the other of such seats being formed as an annular knife edge 77 on the lower end of a sleeve 75 which is threadedly mounted in a bore in a longitudinal partition 76 in the valve body extending alongside the partition 67.

The valve is selectively opened and closed by means of a plunger 79 which extends transversely of the valve body 62 and has its outer end telescoped through the O-ring 74 and received in a central seat in the inner end of the plunger 70. The spring 72 constantly urges the plunger 70 of the O-ring 74 in a radially inward valve closing direction. The valve is opened to varying degrees by means engaging the inner end of the plunger 79 and thrusting it and the plunger 70 downwardly.

Such valve opening means includes a downwardly open cup-like member 82 within which the upper end of the plunger 79 is telescoped. Member 82 is centrally affixed and sealed to an upwardly arched diaphragm 80 which spans the valve housing and seals the outer end of the cavity 66, and to a lower spring seat 83. Mounted within the forward portion 84 of the housing of valve 21 is a coil compression spring 86, the lower end of which is received within the lower spring seat 83 and the upper end of which is affixed in a second, upper spring seat 87. The spring 86 has a compressive strength which substantially exceeds that of spring 72. Spring seat 87 is affixed to the lower end of a threaded stud 89 which is mounted in a threaded bore in the end portion 85 of the extension 84 of the valve housing. When the stud 89 is screwed up or down by turning an adjusting knob (not shown) attached to the outer end 90 of the stud, the spring 86 is thrust downwardly thereby overcoming the spring 72 and opening a gap between the valve seats 74 and 77. Oxygen entering the valve through pipe 40 then passes upwardly from the gap between the open valve seats, through the sleeve 75 into the space 66, and thence out pipe 41.

The valve 21 functions as follows:

With the regulating valve 69 proper of the flow control valve 21 held open by the adjustment spring 86, the gas passes through the regulating valve into the chamber 66 below the diaphragm. Note that this chamber contains the outlet 41 for the regulator. As gas pressure builds up in this chamber 66, the product of gas pressure and diaphragm area will produce force sufficient to compress the adjustment spring 86. As the adjustment spring is compressed, and the diaphragm 80 moves up, the regulator valve 69 follows toward closure. The opposing forces created by spring pressure and gas pressure modulate the opening of the valve 69 to maintain a preadjusted, constant balance of pressure across the diaphragm 80, regardless of the volume of gas flowing through the regulator.

The spring pressure exerted by the adjustment spring 86 can be increased or decreased by turning the adjustment screw 90 counterclockwise for increased pressure or clockwise for decreasing pressure. An increase in spring pressure will cause an increase in gas pressure required to re-establish balance under the diaphragm.

THE OXYGEN FLUSH VALVE

The oxygen flush valve 25, which is shown in detail in FIG. 7, is generally similar to the above described valve 21. Consequently, parts of valve 25 which are similar to those of valve 21 are designated by the same reference characters but with an added prime, and need not be further described. Since valve 25 has only two operative positions, the closed position shown in FIG. 7 and a fully opened position in which the plunger 70' is fully depressed, there is no necessity for the provision of means for adjusting the valve to intermediate positions, as in FIG. 6. Consequently, valve 25 merely has an outer operating plunger 91 which in its inner portion is in the form of a sleeve bearing upon member 83' and in its outer portion is in the form of an extended button 92 extending outwardly through a central hole in portion 85' of the valve body. It will be apparent that in order to open the valve 25 it is merely necessary to press button 92 inwardly, thus depressing the plunger 70' through the action of the plunger 79'. As in the case of valve 21, the diaphragm 80' functions completely to seal the outer end of the cavity 66' from the atmosphere.

THE GAS-ANESTHETIC MIXTURE CONTROL VALVE

The gas-anesthetic mixture control valve 24 is particularly shown in FIGS. 9 and 10, the valve being shown in an intermediate open position in the former and closed in the latter figure. Valve 24 has a valve body 94 which is affixed to the front panel portion 19 of the cabinet in the manner shown. Thus a forward, smaller diametered threaded portion 101 of body 94, which is joined to the main portion of body 94 at a transverse annular shoulder, extends through a hole in panel 19. A cap 120 has an outer head portion 121 having a rear internally threaded skirt or sleeve portion 122 which is threaded upon portion 101 of body 94. Interposed between the panel 19 and the rear end of the skirt 122 are a spacer washer 225 and a dial 211, to be described, which are telescoped over the portion 101 of the valve 24, and an annular, wavy spring washer 214 surrounding spacer washer 225. The cap 120 is tightened upon portion 101 of the valve 24 so as to retain the valve 24 firmly upon panel 19, while permitting the washer 214 to be turned relative to the valve 24 and the dial 211 in a manner and for a purpose to be described. A fitting forming block 95 is secured to the inner end of body 94, the inner end of the valve body 94 being sealed to the block 95 by an O-ring 97, as shown. Block 95 has a central bore 96 through which oxygen is admitted to the valve, and a laterally located passage 117 which communicates with a passage 116 in the valve body through which oxygen is discharged from the valve.

Valve 24 has a first, fixed valve seat in the form of a sleeve 99 which is secured to the valve body by being compressed between an annular shoulder in the body and a bushing 100 threaded into the inner end of the valve body. Sleeve 99 may be made, for example, of a plastic material such as polytetrafluoroethylene. Extension 101 of the valve body has a central bore 102 therein within which there is reciprocably mounted a plunger 104. Plunger 104 has a main body 105 of intermediate diameter, an enlarged head 106, and a small diametered inner end portion 110 which extends axially of a somewhat larger bore 113a in the body of the valve. Head 106 is sealed to the wall of bore 102 by an O-ring 107 which is positioned in an annular groove 109 in such head. Portion 110 of the plunger 104 has a V-shaped groove 111 therein, the groove being widest at the inner free end of plunger portion 110 and decreasing in width to zero at its apex 112. It will be apparent that when the plunger 104 is thrust inwardly of the valve body to such extent that apex 112 of the groove 111 lies inwardly of the outer or forward edge 114 of the sleeve 99, as shown in FIG. 10, the valve is closed. When the plunger 104 is moved outwardly sufficiently for the apex 112 to lie outwardly beyond such edge 114 of the sleeve 99, the valve is open; the degree of opening of the valve increases as the plunger 104 is moved outwardly. When the valve is opened, a passage is provided through bore 96 through the V-groove 111 into a frusto-conical cavity 115 within the valve body outwardly of bore 113a and thence outwardly through the communicating passages 116 and 117. This passage serves to promote the maintenance of laminar flow of the gas throughout the usable range of the valve settings.

The positioning of the plunger 104, in order to adjust the degree of opening of the valve, is effected as follows: A coil compression spring 119 which is telescoped about the body of plunger 104 acts between the inner end of the cavity 102 of the body and the inner transverse surface of the head 106. The plunger 104 is thus constantly urged by spring 119 toward its valve-open position. The plunger is thrust toward its valve-closed position by a stud 124 having a threaded body portion 125 which is mounted in a central opening having threads 126 in the end portion 121 of the cap 120 of the valve 24. The inner end 129 of stud 125 is made in the form of a part of a sphere, the central portion of surface 129 engaging a hardened insert 130 seated in the enlarged end of the plunger 104 and having a flat outer surface. The adjusting stud 124 is prevented from withdrawal from the cap 120 of valve 24 by a spring ring 127 which is snapped into an annular groove in stud 124 and lies inwardly of the head 121 of the cap. The stud 124 is turned by means of a knob 132 which is secured to the outer end 131 of the body 125 of the stud 124 by a set screw 135. Knob 134 may be provided with a distinctively colored insert 137 for ready recognition by the anesthetist.

The valve 24 is provided with the above described adjustable inner and larger diametered dial 211 which is graduated in degrees centigrade, and an outer smaller diametered dial 212 which is secured to the lower edge of the skirt 136 of the adjusting knob 132 for the valve, the dial 212 being graduated in percentage of volatilized anesthetic which is delivered to the outlet port 35 of the apparatus. Such dials 211 and 212, which are shown more particularly in FIGS. 9, 10, 11, and 12, will be more particularly described later in connection with the manner of operation of the apparatus.

Alternatively, the V-shaped groove 111 may be replaced by a rectilinear groove having a cross sectional area which gradually increases in a direction axially of the valve plunger portion 110. Such gradually increasing cross section of the groove may be produced, for example, by the curved root of the kerf of a cut in such plunger portion 110 by a large circular saw or milling cutter positioned in a radial plane through the axis of portion 110. Such groove has been found to be advantageous both for better control of the flow of gas through the valve and for maintaining the desired laminar flow of the gas.

THE VAPORIZER BLOCK 26

The vaporizer block 26 and the fixed orifice means for the diluent gas contained therein are more particularly shown in FIGS. 4, 5, and 13–18, inclusive. Such block, which is generally in the form of a parallelopiped, with a front corner edge cut off at an angle has a flat horizontal upper surface 141, a flat horizontal lower surface 142, and a composite front surface consisting of a lower vertical portion 144 and an upper rearwardly slanting portion 145. The vertical rear surface of block 26 is designated 146, and the left- and right-hand surfaces thereof (FIGS. 14–17) are designated 147 and 149, respectively. As above explained, the block 26 is secured to the right-hand wall of the cabinet 12 by machine screws 27 threaded into openings 28 in the left-hand face 147 of the block 26.

Extending inwardly from the surface 147 of the block 26 are three threaded bores 46, 50, and 57, bore 46 being connected to pipe 51 and receiving carrier gas therefrom, bore 50 being connected to the pipe 49 and receiving flushing gas therefrom, and bore 57 being connected to pipe 56 which delivers to such bore a precisely measured portion of the total oxygen flow from valve 24 to the chamber 29. See FIG. 8. The bore 46 extends inwardly of the block 26 to connect with a further bore 150 transverse to bore 46, bore 150 extending inwardly from the rear surface 146 of the block 26 in a direction normal thereto. The bore 150, which is adapted to receive a fixed orifice providing means 153, shown in detail in FIG. 15, has a smaller diametered inner end 151 which receives the smaller inner end portion 155 of means 153. In the embodiment shown, means 153 is formed from a conventional hypodermic needle, a predominant part of the forward needle portion thereof having been removed so as to leave only the relatively short forward needle portion 155 thereof. Portion 155 has a highly accurate bore 167 therethrough. The orifice means 153 is mounted as a part of an orifice assembly retainer to be described, the retainer being held in place and the outer end of the bore 150 being sealed by an orifice retainer nut 163 which is threadedly received in a threaded counterbore 152 at the outer end of bore 150.

As shown, the orifice means 153 has an enlarged body 156 adjacent its outer end, there being a somewhat smaller diametered sleeve 157 extending from the outer end of body 156, sleeve 157 terminating in a radially outwardly extending flange 158. Secured to the inner end of the nut 163 is a threadedly mounted orifice retainer bushing 159 within the inner end of which there is telescoped a short sleeve 160 in sealing relationship therewith. The inner end of sleeve 160 is telescoped within and sealed to the outer end of sleeve 157 of the orifice means 153, as shown in FIG. 14. The orifice means 153 and the mounting and assembling means therefor thus present a passage therethrough which is in series with the carrier gas receiving bore 46. The effective limiting area of such passage is the small and very accurate bore 167 through the forward portion 155 of the orifice means 153. It will be apparent that other similar means having different predetermined effective areas of bore 167 may be readily substituted for the means 153 shown.

The diluent gas entering bore 46 travels into the bore 150 and thence to the small bore 151, escaping therefrom through the passage 167 in orifice means and thence into the interior of the hollow nut 163. The chamber 168 within the outer end of nut 163 communicates with an outer counterbore 154 in block 26 through an inclined passage 166 in the nut 163. The passage 166 and the counterbore 154 are sealed by an O-ring 164 which is positioned in an annular groove within the outer flange of the nut 163 and is thus held sealed between such flange and the rear surface 146 of block 26 radially outwardly of the counterbore 154. The inner end of the nut 163 is sealed to the inner end of the threaded counterbore 152 by a second O-ring 165 which is held in compression between the inner end of such portion of the nut 163 and the inner end of counterbore 152.

THE CHECK VALVE

The counterbore 154 in block 26, to which carrier gas is delivered after having passed through the fixed orfice means 153, is connected by a passage 169 to a further passage 170 in block 26, passage 170 extending to a bore 171 which extends downwardly from the upper surface 141 of the block as particularly shown in FIG. 5. Bore 171 extends downwardly for generally one-half the thickness of the block 26, thus providing a mixing chamber for the mixing of diluent gas flowing through the fixed orifice 153 with carrier gas carrying vaporized anesthetic from the chamber 29. A coaxially disposed smaller bore 172 in the block 26 communicates with the bottom of bore 171 and extends downwardly to a horizontally disposed passage 59 (FIG. 5) located adjacent the bottom of the block 26. The gas-anesthetic mixture which is produced in the chamber 29 in a manner to be described, passes upwardly therefrom through an inclined passage 199 (FIG. 5) into the horizontal passage 59 from which it passes upwardly into the bore 172, and, by unseating the valve disc 174, into the lower portion of the bore 171. From the lower portion of bore 171 the mixture passes to a bore 61 by which it is conducted to the outlet port 35 in block 26, as more particularly shown in FIGS. 16 and 17.

The above-mentioned check valve 60 is positioned within the block 26 at the juncture between the bores 171 and 172. Such check valve is in the form of an imperforate disc 174 (FIGS. 5 and 18) which is floatingly mounted in the lower end of bore 171 and is urged by gravity downwardly toward an upstanding annular flange 177 which is positioned at the upper end of the bore 172 as shown in FIG. 18. When the disc 174 is in its lowermost position, lying upon flange 177, it prevents the passage of gas rearwardly and downwardly from the passage 61, 171 into the bore 172. The check valve, however, permits the gas-anesthetic mixture to flow upwardly from bore 172, thereby lifting the disc 174, and permitting such mixture to flow forwardly into the passage 61. As shown, the outer, upper end of the bore 171 is sealed by a plug 175 which is screwed into the threaded outer end of the bore 171.

THE SYSTEM FLUSHING MEANS

As above explained, the center bore 50 in the block 26 is connected to the pipe 49 (FIG. 8) by which it receives flushing carrier gas from the same pressure source as that which supplies carrier gas to bore 46. The bore 50 is connected to passages 179 and 181 (FIG. 17) which intersect at 180, passage 181 being connected to the bore 171 above the upper surface of the check valve disc 174 when the latter is in its lower closed position, as shown in FIG. 18. Thus when flushing gas is introduced under pressure into the bore 50, such gas is prevented by the check valve 60, 174 from travelling rearwardly into the bubbler chamber 29. Such flushing gas, however, as is clear from FIG. 8, is able to travel into and thus flush the remainder of the system, including the carrier gas circuit through the valve 21, the passages or pipes 51 and 61 and the fixed orifice device 48. During such operation the upper surface of the check valve disc 174 is subjected to the full pressure of the flushing gas; since such upper surface of the disc is appreciably larger than the area of bore 172, the disc 174 is stably held in its lower closed position when the system is flushed, thereby not only preventing the reverse flow of flushing gas through the check valve 60 but also preventing the escape of any gas-anesthetic mixture forwardly therethrough.

THE GAS-ANESTHETIC CIRCUIT

The third bore 57 opening from the left-hand face 147 (FIG. 17) of block 26 is connected to the pipe 56 which leads from the valve 24, as shown in FIG. 8. From the inner end of bore 57 there extends a passage 184 which connects with a vertically extending bore 185, as shown in FIGS. 4, 14, and 17. The bore 185 is threaded at 187 and receives the threaded upper end of a vertically disposed tube 186 (FIG. 4). The carrier gas thus introduced into the bore 57 in block 26 travels through passage 184 to the bore 185 and thence downwardly through the tube 186 which terminates adjacent the bottom of the container or chamber 29 in a bubbler device 31 which is immersed in the liquid anesthetic in such chamber. Tube 186 is surrounded in its upper end intermediate portions by a tube 188 which is radially spaced therefrom, the tube 188 being made of metal having a high coefficient of thermal conductivity such as copper or aluminum and functioning as a heat sink. The tube 188 is retained in position by an inwardly directed flange 189 on the upper end of the tube, the flange 189 being compressively retained between the lower surface 142 of the block 26 and a flange 190 on the tube 186 adjacent the upper end thereof. A plurality of radially directed holes 191 in the tube 188 permits the free circulation of the liquid anesthetic therethrough and through the annular space between the inner tube 186 and the outer tube 188. Because the compression engagement between the upper end of the tube 188 and the block 26, the tube 188 is maintained at substantially ambient temperature by interchange of heat with block 26, and the tube 188, in turn, maintains the liquid anesthetic in the chamber 29 at the same, ambient temperature. This is important, because the setting of the valve 24 whereby the percentage of anesthetic in the mixture finally delivered to the patient is predicated upon a known predetermined temperature of the liquid anesthetic in chamber 29.

The container 29, which may be in the form of a transparent jar, is retained upon the block 26 by a holder 195 which is generally in the form of an inverted cup and which is threaded to receive the threaded upper end of the jar. Interposed between the lip at the upper end of the jar 29 and the annular inner surface of the upper portion 196 of holder 195 is a sealing ring 197 which is compressively received between the lip of the jar and the inner surface of holder 195. The sealing ring 197 surrounds the lower end of the angular passage 199 in block 26, so that the gas-anehthetic mixture in the upper end of container 29 is permitted free access to the lower end of such passage 199. The bubbler means 31, which is secured to the lower end of tube 186, includes an imperforate transverse disc 192 sealed to the lower end of tube 186. Secured to the lower surface of disc 192 is a shallow upright foraminous cup 194 through which the carrier gas supplied through tube 186 passes in a plurality of thin streams, thus to bubble up through the liquid anesthetic in container 29 and to provide the desired gas-anesthetic mixture in such container above the upper surface of the liquid anesthetic therein.

The upper end of the angular passage 199 in block 26 ih threaded at 200 and thus receives a threaded upper portion 201 of the stem 202 of the thermometer 32. The lower end of the stem 202, which is of substantially smaller diameter than passage 199, extends downwardly an appreciable distance therethrough into the upper end of the container 29. Tied about the lower end of the stem 202 by a string 206 is an upper sleeve portion 205 of a wick-like member 204 which depends from the thermometer stem 202. The member 204 is preferably gathered somewhat above its lower end by a further string 207. The lower end of member 204 is immersed in the liquid anesthetic in container 29. Such anesthetic thus saturates the upper end 205 of member 204 with anesthetic, and maintains the lower end of the thermometer stem 202 at the temperature of the saturated gas-anesthetic mixture existing within the chamber 29 above the upper surface of the liquid anesthetic within such chamber. The thermometer 32 thus accurately indicates the temperature of the gas-anesthetic mixture delivered to the outlet port 35 of the apparatus.

As shown in FIGS. 9 and 10, the temperature dial 211 and the spacer washer 225 are tightly engaged between the rear end of the sleeve 120 of valve 24 and the panel 19 of the cabinet. Thus the dial 211 is held from rotation about its axis. The spring washer 214, however, is rotatable about the periphery of the spacer washer 225. Washer 214 is made of spring metal and has a number of diametrically opposed low points and a number of diametrically opposed high points, the high and low points being angularly spaced successively around the washer. When the parts are assembled as shown in FIGS. 9 and 10, the spring washer 214 is compressively engaged between the panel 19 of the cabinet and the rear surface of the temperature dial 211 so as to be stably held therebetween but to be capable of being turned about its axis without undue effort.

The spring washer 214 carries at one zone thereof an upwardly and then downwardly bent tang 215, the forward portion of the tang overlying the rim of the temperature dial 211 and forming an indicating pointer cooperating with the graduations on such dial. Projecting forwardly from the dial 211 is a stop pin 221 which may be secured to the dial as by having its rear end riveted thereto. The adjusting knob 132 of the valve 24 has a rearwardly projecting skirt 136 upon which the dial 212 is secured as by being pressed thereon. The dial 212 carries on its forward face indicia indicating the percentage of vaporized anesthetic to be delivered through the outlet port 35 of the apparatus. Dial 212 has a radially outwardly projecting stop pin 222 thereon, pin 222 extending radially outwardly beyond the forward end of the stop pin 221 so that the knob 132 of the valve 24 is prevented from turning more than 360° from its closed position (FIGS. 11 and 12) to its fully open position (FIG. 9).

METHOD OF OPERATION OF THE APPARATUS

The container 29 is partially filled with vaporizable liquid anesthetic which is poured thereinto through the charging opening 217 in the block 26. To facilitate such charging of the container 29, the upper surface of the block 26 is provided with a downwardly converging frusto-conical depression 216 surrounding the upper end of the passage 217. Passage 217 is sealed by the stopper means 30 as seen in FIG. 1. The inlet gas passage 34 of the apparatus is connected to a source of oxygen at, for example, 50 pounds per square inch pressure and the face mask of the breathing circuit (not shown) which is connected to the outlet port 35 of the apparatus is then held over the patient's face. The breathing circuit may include a so-called circle absorber for the absorption of carbon dioxide from the gas exhaled by the patient.

Controlled administration of the anesthetic is then carried out by the following three-step procedure:

(1) The temperature of the liquid anesthetic and of the carrier gas-vaporized anesthetic mixture in container 29 is noted by the position of the pointer 33 on the dial of the thermometer 32. The spring washer 214 is then rotated about its axis to bring the pointer 215 thereof opposite the temperature on fixed dial 211 which corresponds to that indicated by thermometer 32.

(2) The oxygen flow control valve 21 is then adjusted to the desired rate of oxygen flow, which will be indicated by the pointer 209 on the dial 210 of flowmeter 22.

(3) The knob 132 of the valve 24 is now turned until the desired percentage reading of anesthetic on dial 212 is positioned opposite the pointer 215 of the previously adjusted washer 214.

There is now delivered through the outlet port 35 and thus to the patient's breathing circuit a carrier gas-vaporized anesthetic mixture which contains an accurately controlled desired percentage of anesthetic. Ordinarily one setting of the valve 24 is sufficient during an operation. Should, however, the temperature of the operating room vary appreciably, the valve 24 may be readily adjusted by first turning the spring washer 214 to the new temperature indicated by thermometer 32 and thereafter turning the knob 132 of the valve 24 to align the desired percentage of anesthetic on dial 212 with pointer 215.

The flushing valve 25, assuming that the carrier gas is oxygen, provides an immediate source of pure oxygen at a very high rate of flow. Valve 25 thus provides not only oxygen for emergency service, but also oxygen which may be employed to hasten post-operative recovery from anesthesia. As above explained, the check valve 60, 174 prevents the delivery of carrier gas-vaporized anesthetic mixture into the patient's breathing circuit while the flush valve 25 is being actuated.

The anesthesia apparatus of the invention has a number of advantages in both construction and manner of use, as can be seen from the above. It would be well, however, specifically to describe the main advantages which result from the disclosed construction of the fixed orifice means 48.

The fixed orifice means 48 presents a marked resistance to being plugged by foreign matter entrained in the diluent gas circuit. Thus, by locating the device 153 of means 48 in such circuit with the end 155 thereof upstream and supported outboard by the nipple 160 and sleeve 157, the inlet of the orifice, the bore 167, presents a very small area which is difficult for entrained foreign particles to find. The chamber 151, into which the small conduit 155 projects presents, with the connected bore 150, a relatively large chamber of gas under pressure. In such large chamber 150, 151 the gas moves slowly, and any suspended foreign matter will tend to precipitate out and fall to the bottom of the chamber. The volume of turbulent gas in the chamber is very small, and is located in the immediate vicinity of the entrance end of the bore 167 in the orifice means 153.

The small smooth walled bore 167 is of very precise cross-sectional area, a characteristic of hypodermic needles, which are commercially available at a comparatively low cost. The bore 167 is such as to maintain a condition of laminar flow therethrough in the range of upstream pressures which are required during the operation of the apparatus. For this purpose, the length of bore 167 is chosen so as to be approximately 10 times the diameter of the bore. With such bore, the rate of flow of gas therethrough varies linearly with changes in the pressure of gas supplied to the inlet 34.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. The disclosed anesthesia apparatus may be used in either human or animal surgery, although it is particularly attractive for the latter use because of the simplicity and economy of the apparatus.

What is claimed is:

1. Anesthetizing apparatus, comprising a casing forming an enclosed chamber adapted to contain a quantity of volatilizable liquid anesthetic, a source of gas under pressure, a first conduit means to introduce gas from said source into the chamber so as to entrain vaporized anesthetic therein to form a gaseous mixture, an outlet port in the apparatus, a second conduit means extending from the chamber to the outlet port, adjustable valve means interposed in one of the first and second conduit means to control the flow of the gaseous mixture discharged from the chamber, a third conduit means extending from the source of gas, said second and third conduit means coming together at a joint whereby the gas delivered through the third conduit means is mixed with the gas anesthetic mixture as they are delivered to the outlet port and demountable means presenting an orifice having a fixed elongated gas passage therethrough interposed in said third conduit means, said passage through said orifice having a length several times the width thereof, said demountable orifice-presenting means comprising means presenting a cavity into which the gas is introduced, and outlet means in said cavity including a conduit means supported with its inlet end projecting a substantial distance into the cavity and spaced from the walls of the cavity.

2. Anesthetizing apparatus as claimed in claim 1, comprising a fourth conduit means extending from the source of gas to the outlet port, and a shut-off valve interposed in the fourth conduit means, whereby the apparatus may be flushed with gas by opening the shut-off valve.

3. Anesthetizing apparatus as claimed in claim 1, comprising a further adjustable gas flow controlling valve interposed in the first conduit means upstream of the said first recited adjustable valve means, and a pressure gauge calibrated to indicate the rate of gas flow through the apparatus in accordance with the flow characteristics of said fixed orifice thus providing a visual reference for adjusting gas flow through said fixed orifice.

4. Anesthetizing apparatus as claimed in claim 1, wherein the cavity has a rear, larger end and a forward smaller end, the conduit means has a rear larger body and a forward smaller end having a forwardly projecting end portion with a small, carrier gas conducting passage therethrough, the forward end of the conduit means being disposed within the smaller end of the cavity with the sides and ends of the smaller end of the conduit means spaced from the confronting surfaces which define the smaller end of the cavity, whereby foreign material entrained in the carrier gas is precipitated in the cavity from carrier gas introduced therein before the carrier gas enters the forward, smaller end of the conduit means.

5. Anesthetizing gas as claimed in claim 1, wherein the said means presenting a cavity comprises a block, the cavity being in the form of a bore extending inwardly from a surface of the block, and comprising means for disposing said conduit means coaxially of said bore comprising a plug threaded into the threaded outer end of the bore, the plug carrying a sleeve-like inner end projecting into said bore, and means on the inner end of the sleeve having telescopic relationship with the outer end of the conduit means and supporting said conduit means therethrough.

6. Anesthetizing apparatus, comprising a casing forming an enclosed chamber adapted to contain a quantity of volatilizable liquid anesthetic, a source of a gas under pressure, a first conduit means to introduce gas from said source into the chamber so as to entrain vaporized anesthetic therein to form a gaseous mixture, an outlet port in the apparatus, a second conduit means extending from the chamber to the outlet port, adjustable valve means interposed in one of the first and second conduit means to control the flow of the gaseous mixture discharged from the chamber, a third conduit means extending from the source of carrier gas, means joining said second and third conduit means together whereby the gas delivered through the third conduit means is mixed with the gas-anesthetic mixture as they are delivered to the outlet port, demountable means presenting a fixed gas conducting orifice interposed in said third conduit means, a thermometer for detecting and indicating the temperature of the saturated gas-anesthetic mixture in the chamber, dial means carried by said adjustable valve means calibrated in the ratio of vaporized anesthetic to gas in the delivered carrier gas-anesthetic mixture over the range of opening of said valve means, an adjustable temperature pointer mounted in cooperative relationship with respect to said dial means, and a fixed temperature scale carrying graduated temperature indicia and mounted for selection by said temperature pointer.

7. Anesthetizing apparatus as claimed in claim 6, comprising a cabinet having a control panel, wherein the adjustable valve means is a valve having a body mounted on said control panel and carrying a first valve seat, and a movable valve element within the body having a second valve seat, means on the body including a rotatable knob for adjusting the degree of opening of the valve, said temperature scale is fixedly mounted on the panel, and the dial means calibrated in the ratio of vaporized anesthetic is secured to the knob to rotate therewith.

8. Anesthetizing apparatus, comprising a cabinet having a housing, and a block disposed exteriorly of the housing and mounted thereon, a source of gas, gas inlet means, a flow control means for controlling the flow of gas from said inlet, a first conduit means leading from the flow control means, and a second conduit means in the form of a loop, having an inlet zone and an outlet zone, connected at the inlet zone thereof to the outlet end of the first conduit means, a fixed orifice means in one branch of the loop between the inlet zone and the outlet zone of the loop, an outlet opening, means connecting the outlet zone of the loop to the outlet opening, adjustable valve means having flow characteristics comparable to those of said fixed orifice in a second branch of the loop between the inlet zone and the outlet zone of the loop, and a mixing means for entraining a vaporized anesthetic in said gas disposed in series with said adjustable valve means between such adjustable valve means and the outlet zone of the loop, said gas inlet means, the first conduit means, the adjustable valve means, and a portion of the second conduit means being disposed in the cabinet, the remaining portion of the second conduit means, the fixed orifice means, and the outlet zone of the loop being disposed in said block, and the mixing means being supported on the block exteriorly of the cabinet.

9. Anesthetizing apparatus as claimed in claim 8, comprising a check valve in the conduit loop between the mixing means and the outlet zone of the loop to prevent the flow of gas rearwardly from the outlet zone of the loop into the mixing means.

10. Anestetizing apparatus as claimed in claim 9, comprising means for flushing the apparatus with gas comprising a third conduit means extending from said gas inlet means to the second conduit between the check valve and the outlet zone thereof, and a selectively operated flushing valve in the third conduit means.

11. Anesthetizing means as claimed in claim 10, the flushing valve, and a portion of the third conduit means being disposed in the cabinet, the remaining portion of the third conduit means and the check valve being disposed in said block.

12. Anesthetizing apparatus comprising a source of gas under pressure, an adjustable regulator adapted to maintain a selected downstream pressure, first conduit means for introducing gas from said source to said pressure regulator, second conduit means delivering gas from said regulator to a gas circuit having two legs, a third conduit means forming one leg of said gas circuit, fixed orifice means in said third conduit means, said fixed orifice means including an elongated restricted passage formed to provide laminar flow of said gas, a fourth conduit means coming together with said second and third conduit means at a joint and forming a second leg of said gas circuit, an adjustable valve means including another elongated restricted passage formed to provide laminar flow of gas therethrough interposed in said fourth conduit means, a volatile liquid anesthetic vaporizing means connected to receive gas from the fourth conduit means, said vaporizing means being formed for the passage of gas from the fourth conduit means therethrough, fifth conduit means joining said third and fourth conduit means on the outlet side of the vaporizing means, an outlet, and sixth conduit means joined to said fifth conduit means for conducting the mixture of gases therefrom to the outlet, and a pressure gauge calibrated to indicate gas flow through the apparatus in accordance with the laminar flow characteristics of said fixed orifice means connected to said second conduit means.

13. Anesthetizing apparatus according to claim 12, comprising a check valve in said fifth conduit means to prevent reverse flow of gas in said fifth conduit means.

References Cited

UNITED STATES PATENTS

| 2,407,221 | 9/1946 | Bloomheart | 128—188 |
| 2,864,363 | 12/1958 | Hay | 128—203 |
| 2,870,764 | 1/1959 | Carlson et al. | 128—188 |
| 3,018,777 | 1/1962 | Dietrich | 128—188 |

FOREIGN PATENTS

| 631,577 | 11/1949 | Great Britain. |

WILLIAM E. KAMM, Primary Examiner